ns Riley &
(12) United States Patent
Eryilmaz et al.

(10) Patent No.: US 7,930,153 B2
(45) Date of Patent: Apr. 19, 2011

(54) ADAPTIVE LOOK UP TABLE: A GRAPHICAL SIMULATION COMPONENT FOR RECURSIVELY UPDATING NUMERIC DATA STORAGE IN TABLE FORM

(75) Inventors: Bora Eryilmaz, Boston, MA (US); Pascal Gahinet, Hopkinton, MA (US); Peter Maloney, Dearborn, MI (US); Zhiping You, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 11/583,416

(22) Filed: Oct. 18, 2006

(65) Prior Publication Data
US 2007/0225951 A1    Sep. 27, 2007

Related U.S. Application Data

(63) Continuation of application No. 10/036,675, filed on Dec. 31, 2001, now Pat. No. 7,139,687.

(51) Int. Cl.
*G06G 7/48* (2006.01)
(52) U.S. Cl. ......................................................... 703/6
(58) Field of Classification Search ........................ 703/6
See application file for complete search history.

(56) References Cited

U.S. PATENT DOCUMENTS

| | | |
|---|---|---|
| 4,270,503 A | 6/1981 | Pomerantz |
| 4,922,835 A | 5/1990 | Van Vliet et al. |
| 5,188,005 A | 2/1993 | Sankpal et al. |
| 5,233,349 A | 8/1993 | Moulsley et al. |
| 5,432,700 A | 7/1995 | Hrovat et al. |
| 5,474,054 A | 12/1995 | Povinger et al. |
| 5,526,261 A | 6/1996 | Kallis et al. |
| 5,533,492 A | 7/1996 | Willey et al. |
| 5,594,655 A | 1/1997 | Berchin |
| 5,743,244 A | 4/1998 | Bush et al. |
| 5,791,332 A | 8/1998 | Thompson et al. |
| 5,819,196 A | 10/1998 | Holmes et al. |
| 5,821,934 A | 10/1998 | Kodosky et al. |
| 5,951,884 A | 9/1999 | Futamura et al. |
| 5,974,254 A | 10/1999 | Hsu |
| 6,035,632 A | 3/2000 | Stander et al. |
| 6,073,619 A | 6/2000 | Baranowski et al. |
| 6,102,965 A | 8/2000 | Dye et al. |

(Continued)

OTHER PUBLICATIONS

Tanenbaum, 1984, "Structured computer Organization", Prentice-Hall, Inc. p. 10-12.*

*Primary Examiner* — Jason Proctor
*Assistant Examiner* — Eunhee Kim
(74) *Attorney, Agent, or Firm* — Nelson Mullins Riley & Scarborough LLP; Kevin J. Canning

(57) ABSTRACT

A graphical block that defines the functionality of a lookup table and can be used in a block diagram model to capture time-varying characteristics of a system's behavior in the lookup table is presented. The block uses input and output data of the system to dynamically create and update the contents of the underlying lookup table over time. More specifically, the block utilizes an adaptation process that uses the system (or plant) output data to recompute the table values. The adaptation process is implemented as a statistical and signal processing algorithm, such as Recursive Sample Means (RSM), Least Mean Squares (LMS) and Recursive Least-Squares (RLS). The adaptation can be cell-based or point based.

47 Claims, 7 Drawing Sheets

U.S. PATENT DOCUMENTS

| | | |
|---|---|---|
| 6,138,642 A | 10/2000 | Zhang et al. |
| 6,161,531 A | 12/2000 | Hamburg et al. |
| 6,242,873 B1 | 6/2001 | Drozdz et al. |
| 6,282,547 B1 | 8/2001 | Hirsch |
| 6,757,644 B1 * | 6/2004 | Murayama ........................ 703/6 |
| 6,868,526 B2 | 3/2005 | Singh et al. |
| 2001/0022532 A1 * | 9/2001 | Dolman ........................ 330/149 |
| 2003/0018953 A1 | 1/2003 | Aberg |
| 2003/0038842 A1 | 2/2003 | Peck et al. |
| 2003/0058959 A1 * | 3/2003 | Rafie et al. .................... 375/296 |

* cited by examiner

Block Parameters: Adaptive Lookup Table  □ □

Adaptive Table Lookup (mask)
Perform 1 or 2 dimensional adaptive table lookup.
Breakpoint sets relate the input values to cell locations
in the table. The data is used to dynamically update
the cell values at these positions.

Parameters

Number of table dimensions: 2 —————————92

First input (row) breakpoint set:
[1 2 4]                                           94

Second input (column) breakpoint set:
[1 2 3]                                           94

106 — Use one (vector) input port for data

Table data (initial):
[1 2; 3 4]                                        96

Table numbering matrix:
[1 2; 3 4]                                        98

108 — Table matrix output port

Save table data to workspace

Table name:
ver                                              100

110 — ⌐ Adaptation enable/disable port

_ Adapt to out-of-range data

Adaptation method  Sample mean (with forgetting) — 102

Adaptation speed (0 to 1):
0.6                                              104

112 — ⌐ Cell lock enable/disable port

OK    Cancel    Help    Apply

FIG. 3

ADAPTIVE LOOK UP TABLE: A GRAPHICAL SIMULATION COMPONENT FOR RECURSIVELY UPDATING NUMERIC DATA STORAGE IN TABLE FORM

RELATED APPLICATIONS

This application is a continuation of, and claims the benefit of, co-pending U.S. patent application Ser. No. 10/036,675, filed on Dec. 31, 2001, naming the same inventors and the same assignee as this application. The disclosure of the above-mentioned application is hereby incorporated by reference herein in its entirety.

BACKGROUND

The invention relates generally to graphical block diagram modeling.

Dynamic systems may be modeled, simulated and analyzed on a computer system using graphical block diagram modeling. Graphical block diagram modeling graphically depicts mathematical relationships among a system's inputs, states and outputs, typically for display on a graphical user interface.

In a graphical block diagram model, graphical blocks describing the static or dynamic behavior of corresponding physical components are graphically connected to each other in order to simulate the aggregate behavior of the combined physical system or plant. The behavior of a physical system, which may include mechanical or electronic components, can be described in terms of numeric data stored in table (matrix) or multi-dimensional array format in computer memory. The resulting table or array is referred to as a lookup table and is well known in the art.

In the simpler two-dimensional case, lookup tables correspond to matrices studied in the field of mathematics. Each element of a matrix is a numerical quantity, which can be precisely located in terms of two indexing variables. At higher dimensions, lookup tables are represented as a collection of matrices, whose elements are described in terms of a corresponding number of indexing variables. In the area of computer programming and simulation, lookup tables provide a means to capture the behavior of a physical system. More specifically, the behavior of a system with M inputs and N outputs can be approximately described by using N M-dimensional lookup tables.

Lookup tables can be generated by experimentally collecting or artificially creating the input and output data of a system. In general, as many indexing parameters are required as the number of input variables. Each indexing parameter may range within a pre-determined number of values, which are called breakpoints. The set of all breakpoints corresponding to an indexing variable is called a grid. Hence, a system with M inputs has M grids or sets of breakpoints. For given input data, the breakpoints (in breakpoint sets corresponding to the input variables) are used to locate the array elements where the output data of the system are stored. For a system with N output data values, N array elements are located and the corresponding data are stored at these locations in a computer memory.

In prior lookup table schemes, once a lookup table is created using the system input and output data, the corresponding multi-dimensional array of values can be used in applications without the need for regenerating the system output data. Only the input data is required to locate the appropriate array elements in the lookup table, and the approximate system output data can be read from these locations. Therefore, a lookup table captures an input-output mapping of a static or dynamic system in the form of numeric data stored at predetermined array locations.

Prior graphical block-based modeling and simulation tools, e.g., Simulink® from The MathWorks Inc, support graphical lookup table blocks that provide for such a static mapping of input-output behavior of a physical system. Because the behavior of actual physical systems can vary with time due to wear, environmental conditions, and manufacturing tolerances, however, the "static" lookup table block may not provide a valid representation of the plant characteristics at a given time.

SUMMARY

The present invention is therefore directed towards a graphical lookup table block that takes into account the time-varying nature of the system behavior that it is used to describe. In particular, the present invention provides methods and systems for adapting the values of a lookup table over time to account for additional data from the physical plant or system that it models.

In one aspect, the invention provides methods and apparatus, including computer program products, for table lookup. The methods include providing to a graphical block diagram model a graphical block that defines a lookup table and having inputs for receiving input data, and using the graphical block to update content stored in the lookup table based on received input data.

Particular implementations of the invention may provide one or more of the following advantages.

Unlike prior static lookup table blocks, the adaptive lookup table block of the present invention always provides a valid representation of plant dynamics even though plant behavior may be time varying. Moreover, the underlying adaptation techniques of the adaptive lookup table block are robust against reasonable measurement noise and provide appropriate filtering of noisy output measurements.

The graphical block can be used in a simulation program to dynamically and efficiently update the data stored in a lookup table. That is, the block forms part of a larger simulation model of a physical system, which is represented in a graphical simulation environment. This approach is highly reusable and presents a flexible interface to a user.

The adaptive lookup table defined by the graphical block can be realized in other forms, such as computer programs or code embedded in microprocessor hardware for real-time applications. Supplied in a suitable simulation environment as a graphical simulation block, the method or methods defining the underlying lookup table of the block can be used to automatically generate computer code for embedded applications.

Other features and advantages of the invention will be apparent from the following detailed description and from the claims.

DESCRIPTION OF DRAWINGS

FIG. 3 is an exemplary block parameter dialog box in which a user specifies block parameters for the adaptive lookup table block.

Like reference numerals will be used to represent like elements.

DETAILED DESCRIPTION

Figure 1:
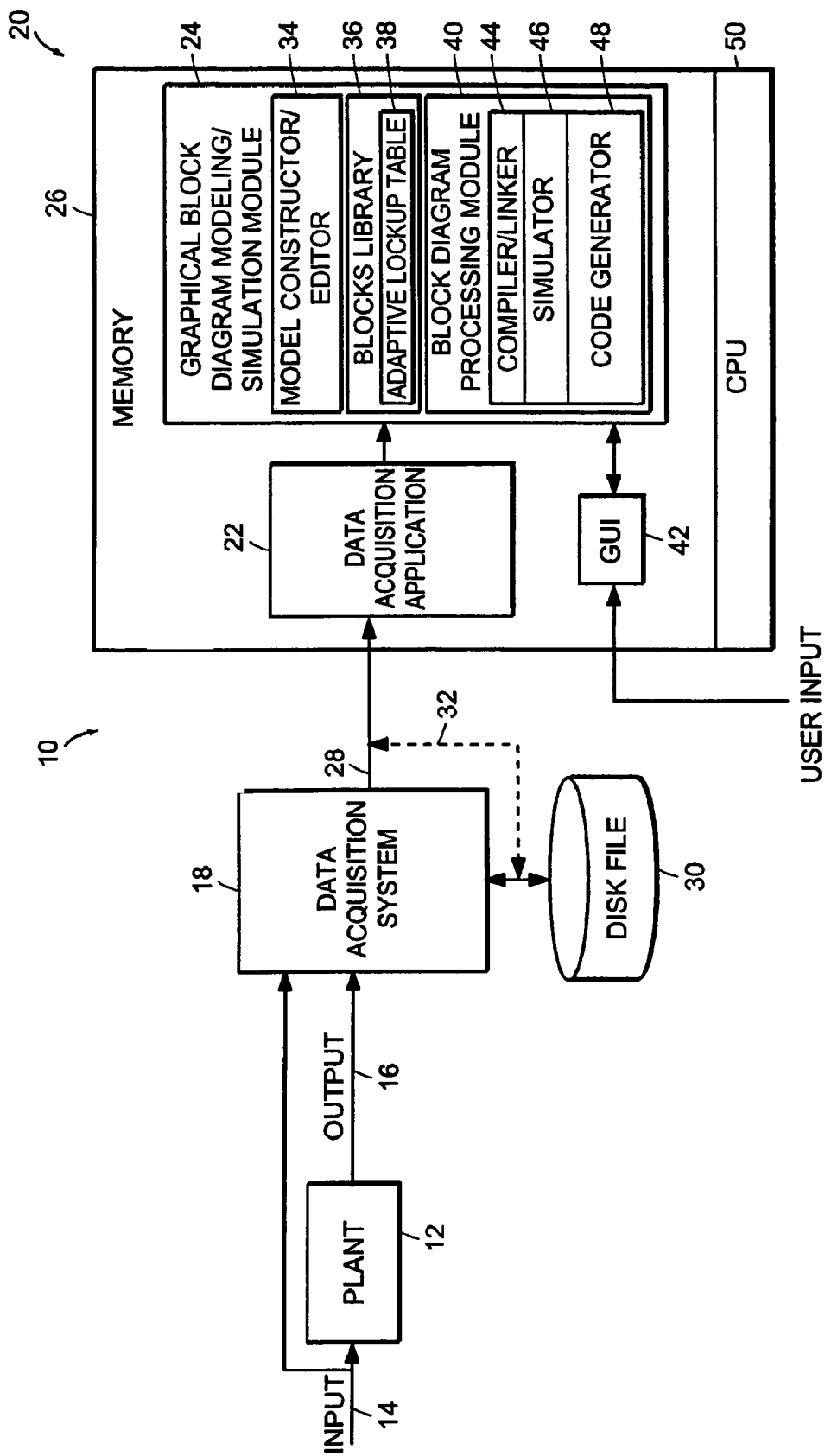
FIG. 1 is a block diagram of an exemplary system simulation environment in which processes of a graphical block diagram modeling/simulation module for graphical block diagram model development and execution, as well as code generation, are executed.

Referring to FIG. 1, a system simulation environment 10 includes a dynamic physical plant or system 12 having known input data 14 and measured output data 16. The output data 16 of the plant 12 can be produced, for example, by placing sensors at appropriate locations in a plant 12. The input data 14 and the measured plant output data 16 are provided to a data acquisition system 18. The data 14, 16 collected by the data acquisition system 18 are made available to a computer system 20 for analysis.

The computer system 20 is configured with a data acquisition application 22 and graphical block diagram modeling and simulation module 24 (hereinafter, simply, "the module"), both of which are implemented in software in memory 26. The data acquisition application 22 receives the experimental data 14, 16 collected by the data acquisition system 18 and provides that data to the module 24. The experimental data can be provided to the application 22 in real-time over a network link or bus 28 or, alternatively, can be stored in a disk file 30 for subsequent retrieval by the application 22 (as indicated by the dashed lines 32). Thus, the data acquisition system 18 need not be coupled to the system 20 as shown.

The module 24 includes a model constructor/editor 34 and a blocks library 36, which includes, among other types of graphical simulation blocks, an adaptive lookup table block 38. The adaptive lookup table block 38 uses the input and output measurements of the plant behavior to create and update the contents of an underlying lookup table. More specifically, the block 38 uses the plant input data to locate table (array) elements by comparing the input data values with breakpoints defined for each indexing variable, and uses the plant output measurements to update the numeric values of the array elements. Thus, the block continuously improves the contents of the lookup table over time. This continuous improvement of the table data is referred to herein as lookup table adaptation. The adaptation process involves complex statistical and signal processing algorithms to capture the time-varying input-output behavior of the plant. The adaptive lookup table block 38 will be described in further detail later.

Still referring to FIG. 1, the module 24 further includes a block diagram processing module (or engine) 40. The model editor 34, in conjunction with the library 36, is used by a user (of the computer system 20) via a Graphical User Interface (GUI) 42 to construct and display a graphical block diagram model which visually and pictorially represents aspects of a dynamic system of interest to that user. The block diagram processing engine 40 includes a compiler/linker 44 to interpret the block diagram generated by the model editor 34, a simulator 46 that executes the interpreted block diagram to produce simulation results and a code generator 48 that converts the interpreted block diagram to executable code (e.g., textual source code, such as C, or firmware source code for execution on an embedded processor), or transmits signals that configure or can be used to configure a hardware device, for example, a field programmable gate array. The simulation results of the adaptive lookup table can also be presented to the user on the computer screen (as later shown in FIG. 7B).

In addition to the memory 24, the system 20 also includes a CPU 50 for executing the various components of the module 20, the GUI 42 and other OS programs (not shown) for controlling system hardware. Although not shown, it will be understood that the system 20 can be, in other respects, of a conventional computer (e.g., PC, workstation) design and architecture. That is, the system 20 may include conventional system I/O peripherals, e.g., display, mouse, keyboard and the like, for enabling user interaction with the system.

For illustrative purposes, the module 24 will be described within the context of a simulation environment that is based on the use of such tools as MATLAB®, Simulink® and Real-Time Workshop®. All of the aforementioned tools are commercial software products available from The Math-Works, Inc. In addition, the data acquisition application 22 and system 18 may be implemented with the Data Acquisition Toolbox® and the xPC Target®, also available from The MathWorks, Inc. The Simulink® software package includes a number of different tools, such as special user interfaces and navigational tools, e.g., a library browser, which will be referenced in the description to follow. Further details of these tools and interfaces can be had with reference to available product documentation. It will be understood, however, that other graphical block diagram based modeling software platforms could be used.

The module 24 enables users to copy graphical blocks into their models from the library 36 (or, optionally, from external libraries). Thus, a user operating the computer system 20 uses the blocks, for example, the adaptive lookup table block 38, to build a graphical block diagram using the model editor 34. A user selects blocks using a menu provided by the Simulink® library browser. Having opened a model window for a model to be generated and/or edited, the user copies the selected blocks from the library window to the model window, e.g., by selecting ("clicking on") a corresponding library node or icon, dragging the block from the library browser and dropping it in the model window.

The term "graphical block diagram" refers to a set of graphical blocks (or nodes) and a set of lines (or signals) that carry data between the graphical blocks. Each graphical block typically performs a function and that function (or equation) is a sub-component of an overall set of equations describing a dynamic system. The function may be mathematical in nature or it may be an operation such as reading data from a hardware device. The graphical blocks may be parameterized with user-defined values, as will be described.

Using the functions or equations defined by each of the blocks, the graphical block diagrams can be executed to produce simulation results and generate textual software or firmware source code automatically as defined by the graphical blocks and signals in a model. Each of the equations is defined in a corresponding method (code module). For example, an output method, when invoked by the simulator 46 during model execution, determines an output signal based on a given input signal and block parameter value(s).

The adaptive lookup table block 38 implements an array of table elements and maps the table elements to one or more sets of indexed values or "breakpoints", typically non-repeating, monotonically increasing values. The breakpoints are the values at which the relationship which the table has sampled is evaluated for a given index. The breakpoints define intervals or segments in which the input value(s) may fall. The blocks determine the location of the input value relative to one of the intervals and use that location to locate the elements and their corresponding numeric table data values. The input values that fall outside these intervals are handled as well. They may be ignored or processed by the adaptive lookup table 38, e.g., treated as if falling within an end interval.

The breakpoints of a lookup table serve to partition the table input space into regions referred to as "cells". Each cell, which can be multi-dimensional, is delimited by two breakpoints for each indexing variable.

In one form of table lookup, the values of the table are associated with respective cells in the table. Thus, for example, a two dimensional table might have a cell that corresponds to the intervals (4, 5) for a first variable $x_1$, and (7,8) for a second variable $x_2$. In such a table, input values within those ranges (e.g., $x_1$=4.2 and $x_2$=7.5) would result in the value of that cell being generated as the output of the lookup table. This type of table lookup is referred to as cell-based lookup.

In another form of table lookup, the values stored in the lookup table are associated with specific intersections of input variables. For example, in a two-dimensional table, a specific value might be associated with the input values of $x_1$=4 and $x_2$=7, and a different value might be associated with the point at which $x_1$=4 and $x_2$=8, at which $x_1$=5 and $x_2$=7, and at which $x_1$=5 and $x_2$=8. In such a table, output values for input values that fall between such defined points (i.e. $x_1$=4.2 and $x_2$=7.5) may be generated by interpolation of the values associated with the specific points that surround the given point. This type of table lookup is referred to as a point-based lookup.

In one embodiment, the table lookup is a cell-based table lookup and the adaptation uses a cell-based table lookup. In the cell-based adaptation, the plant output data that is generated for given plant input data used to update a cell value for the particular cell determined by the table lookup for that input data directly, and that adapted cell value is provided at the block's output. In a second embodiment, the table lookup is point-based and the adaptation uses a point-based table lookup. In the case of the point-based adaptation, the plant output data is used to update the values of the grid points around that cell, and these adapted points (values) are then used to interpolate the exact point at the position identified by the plant input data. The interpolated point is provided at the block's output. Both of these embodiments will be described in further detail below.

The adaptive lookup table block 38 presents one abstraction of a lookup table generation and adaptation process to a high-level user interface. The adaptive lookup table block 38 can be inserted into a physical system model in a graphical simulation environment and provides the necessary connectivity with other simulation blocks in the overall model. Once the user places the graphical simulation block into the larger simulation model, the inputs and outputs of this component can be connected with other components in the model.

Figure 2:
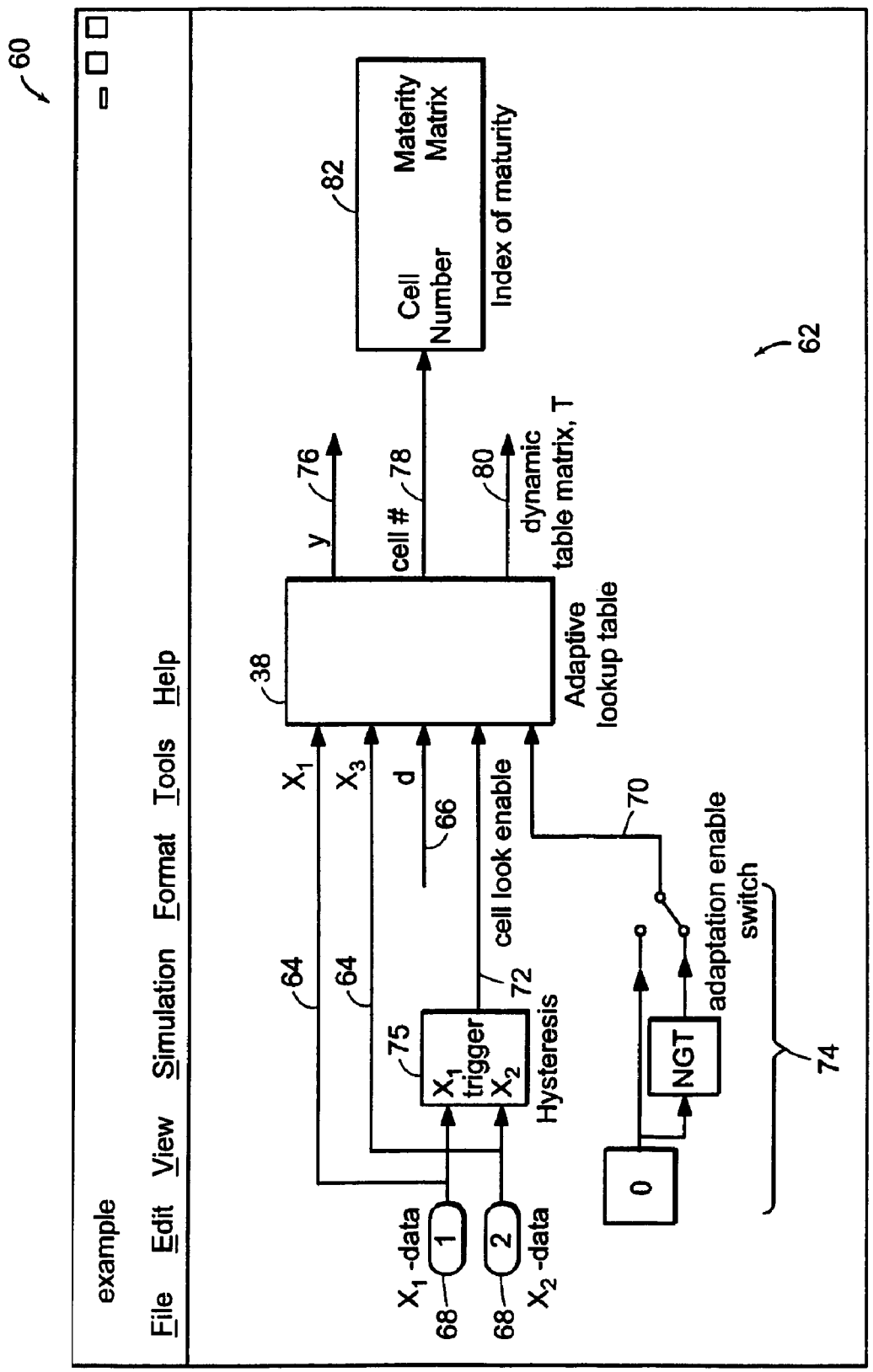
FIG. 2 is an exemplary screen display from a GUI of a computer system executing the model editor of the graphical block diagram modeling/simulation module (of FIG. 1) during development of a graphical block diagram model that includes an adaptive lookup table block.

FIG. 2 illustrates a Simulink® model window 60 that displays an exemplary block diagram model 62 created by a user using the model editor 34 and employing the adaptive lookup table block 38. The adaptive lookup table block 38 is usable to create multi-dimensional lookup tables from empirically gathered physical plant or system data.

In the illustrated embodiment, the block 38 receives the plant data, including plant input data "x" 64 and plant output data "d" 66 as inputs. The plant input data are coupled to respective input data ports 68, which receive the plant input data from the external data collection hardware via the data acquisition application 22. The plant output data "d" 66 is received from other ports not shown in this diagram, and ultimately from the output of the plant. The plant input data 64 are coordinate data and the plant output data 66 are system output measurements, and therefore correspond to the input data 14 and output data 16 (from FIG. 1), respectively. For example, if the plant 12 represents an engine and a user wishes to create a lookup table to model behavior of the engine's efficiency as a function of engine RPM and manifold pressure, then the plant input data values $x_1$ and $x_2$ would correspond to values of RPM and manifold pressure, respectively, and the value of plant output data "d" would correspond to the measured value for efficiency. In the example model 62, the block 38 is configured to perform a two-dimensional lookup table, but can be configured to accommodate any number of inputs "x" 64. More generally, it will be appreciated that an application of the adaptive lookup block 38 need not be limited to the implementation shown in FIG. 2

In addition, the block inputs can include various control signals, such as an adaptation enable/disable input 70 and a locking enable/disable input 72. The adaptation enable/disable input 70 is used to enable or disable the adaptation process. Thus, the user has the ability to start, stop or reset the lookup table adaptation through the use of the adaptation enable/disable input 70. If the lookup table adaptation functionality is disabled, then the table lookup becomes a static table lookup. It may be desirable to disable the adaptation in this manner if, for example, the user notices that there is little change in the values of the output data over time. The state of the input 70 is determined by the setting of switch logic 74 to which the input 70 is connected. The locking enable/disable input 72 is used to restrict the adaptation process to particular elements of the lookup table. More specifically, the lock input 72, in conjunction with other logic, e.g., logic 75, allow the user to update only a particular cell when the plant input data would otherwise place the updating activity outside of that cell during a table lookup/adaptation operation.

Figure 7B:
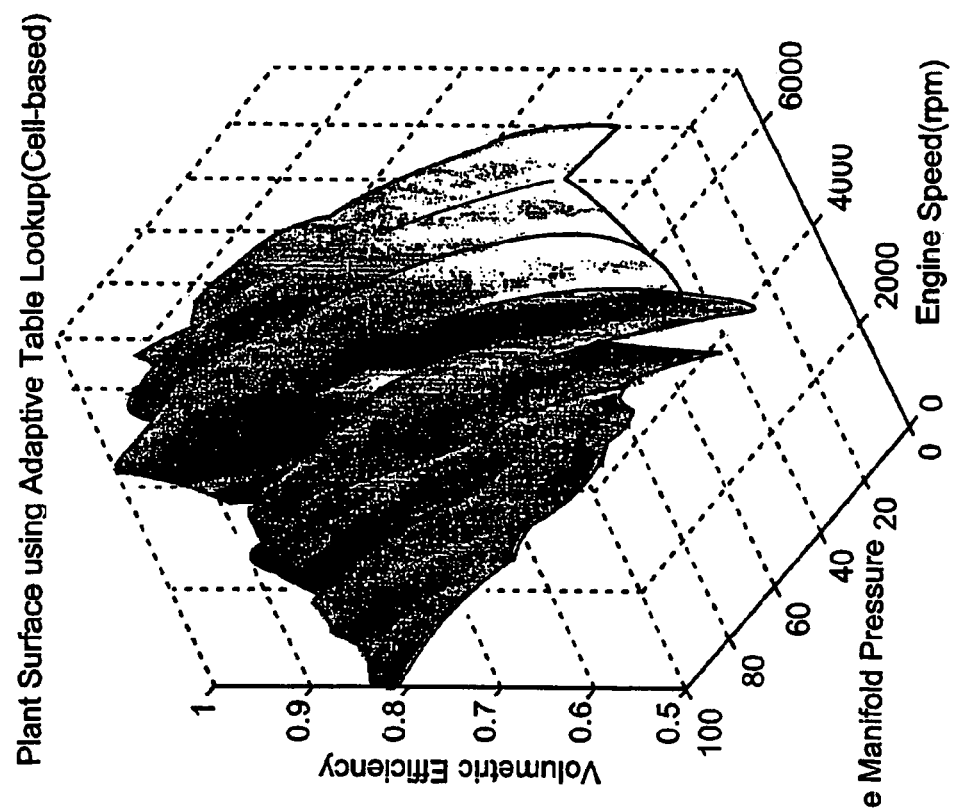
FIGS. 7A and 7B are exemplary plant surface plots generated using measured data and using data produced by adaptive (cell-based) table lookup, respectively.

The outputs of the adaptive lookup table block include a currently adapted table output value "y" 76, an index number of the currently adapted lookup table cell (i.e., cell number 78), or indices of points around the cell, and, if required, post-adaptation table data "T" 80. The table data output 80 may be useful for viewing the table contents in the model window or generating surface plots, as shown in FIG. 7B.

The cell number 78 can be used for different purposes. For example, and as shown in the figure, it can be used to maintain an index of maturity block 82. The index of maturity block 82 counts how many plant output data points the table has received within a particular cell. Thus, the index of maturity block 82 tells the user something about the precision of the table values: the more points within a table cell, the more precise is the adapted value for that cell. The cell number can also be used to track which points in the table are being adapted. If a specific test is designed to generate data in a special order, then the cell number could be compared with the expected order to ensure that that special order is followed.

Referring back to FIG. 1, the library 36 is a repository of classes that correspond to the blocks. When a graphical class is used in a model, it is said to be instantiated, i.e., an instance of the graphical class is created for use in the model. Such an instance is a link to the graphical class that resides in the library 36. The behavior of a block in a block library may be defined in terms of parameters that the user may specify when creating an instance of the block. The behavior of the block is akin to the behavior of a template class as used in object oriented programming languages such as C++. Block parameters are class members that are specified when a user constructs a new instance of a class. Instances associated with the class have parameter specification interfaces that allow a user to set values for these block parameters. On the user's GUI, such as the GUI 42 (of FIG. 1), such parameter specification interfaces take the form of a dialog box with various parameter fields (as will be described with reference to FIG. 3, below). Thus, the user supplies the block parameters to the block method for the appropriate block through a dialog box associated with the block. Alternatively, the user can specify parameter values programmatically using a textual API (e.g., the Simulink® 'set_param' command). Thus, each block in the block diagram model 62 can have parameters that are specified by a user for use in the block methods for those blocks.

FIG. 3 shows a parameters dialog box 90 for the adaptive lookup table 38. The dialog parameters that can be specified for the adaptive lookup table 38 can include the following: number of table dimensions 92; initialization data, including one set of breakpoints for each indexing variable 94, initial lookup table data 96; and a user-defined element indexing scheme (e.g., cell numbering matrix) 98. It is also possible to specify a table name 100; adaptation method 102; and adaptation speed 104. Also, and as is shown in the exemplary GUI dialog box 90, it is possible to specify the inputs and outputs to be used during simulation. For example, the dialog box 90 allows the user to select any of the following: use of one input port as initial table data port 106; use of a table data (matrix) output port 108; use of the adaptation enable/disable port 10; and use of the cell lock enable-disable port 112. Thus, it can be appreciated that most of the adaptive lookup table input and output ports, such as the enable and lock signals, and the table data output, for example, are user-configurable and can be turned on or off via the dialog box 90.

In the embodiment depicted in FIGS. 1 and 2, the plant output data may come from sensor measurements collected by running various tests on the plant 12, and the measured data (along with the corresponding plant input data) is provided to the adaptive table block 38 to generate/maintain the lookup table describing the relation between the system inputs 14 and output 16. When the model 62 is executed during simulation, the initial table begins to adapt to new plant data inputs. Copied to the table output y 76 is the value of the particular array element currently being updated 76 (cell-based) or value interpolated from the array elements being updated (point-based), the index number 80 representing the position of the adapted element(s) in the lookup table according to a user-defined numbering scheme (e.g., cell number), and, possibly, the adapted lookup table data 80 in its entirety.

Once the table is set up and initialized (via the user-specified block parameter values), the execution of the model during simulation causes adaptation algorithms defined for the block to begin learning the unknown values of the lookup table elements. These algorithms use the input and output measurements of the plant behavior to dynamically create and update the contents of the lookup table. Eventually, after a sufficient number of input values has been received so as to populate a sufficient number of cells or points in the table with stable values, a user may choose to disable the adaptation process and utilize the table as a static table for modeling the physical plant. Thus, in the embodiment described thus far, the simulation process serves to capture a model of the plant in the form of a lookup table.

Alternatively, although not shown, the block 38 could be used in a model of a plant having an adaptive lookup table as part of its functionality. That is, rather than receiving data from a physical plant or system, the adaptive lookup table could receive data from other functional blocks in a block diagram model. In this latter scenario, the simulator 46, in executing the block diagram model, would simulate the behavior of the overall system, including the adaptive lookup table (as graphically represented by the block 38). In such an application, the block's inputs would be fed by other functional component blocks in the model, that is, the inputs would receive simulated plant data, and thus the computer system 20 would not require use of internal or external plant data acquisition software or hardware (as was depicted in FIG. 1).

In general, the adaptive lookup table 38 operates as follows. When the adaptation mechanism is disabled, the lookup table acts as a standard static lookup table, providing table output values y 76 in response to received plant input values x 68. When the adaptation mechanism is enabled, the lookup table takes the following steps. It receives the plant input values x 68 and plant output value d 66. It then determines what, if any, stored values already in the table would be relevant for determining the table output value y 76 corresponding to the plant input values x 68. In other words, in the cell-based embodiment, it determines the value of the cell corresponding to plant input values x 68, whereas in the point-based embodiment, it determines the values of points immediately surrounding the point defined by input values x 68. It then uses the plant output data d 66 to modify the existing relevant value(s) in the table. Finally, it generates an output based on the newly updated tables value(s), which is provided on table output y 76.

Various techniques may be utilized to modify existing table values using plant output data d 66. A simple method would be to simply replace the existing values with the newly received plant output data d 66. However such a technique would, under some conditions, create inaccuracies due to noise on the input. Therefore, as input values 68 and output values 66 are received by adaptive lookup table 38, it is desirable that the table respond in a robust and noise tolerant way, while rapidly adapting to changing output values. Thus, the adaptation algorithms utilize various statistical and signal processing methods for robust, noise tolerant, and fast adaptation of the lookup table data. Since the simulation block 38 and the GUI dialog 90 provide a high-level interface to user inputs and encapsulate the statistical computations, the complex decision and adaptation mechanisms may be transparent to the user. The details of these mechanisms will now be described in some detail.

Figure 4:
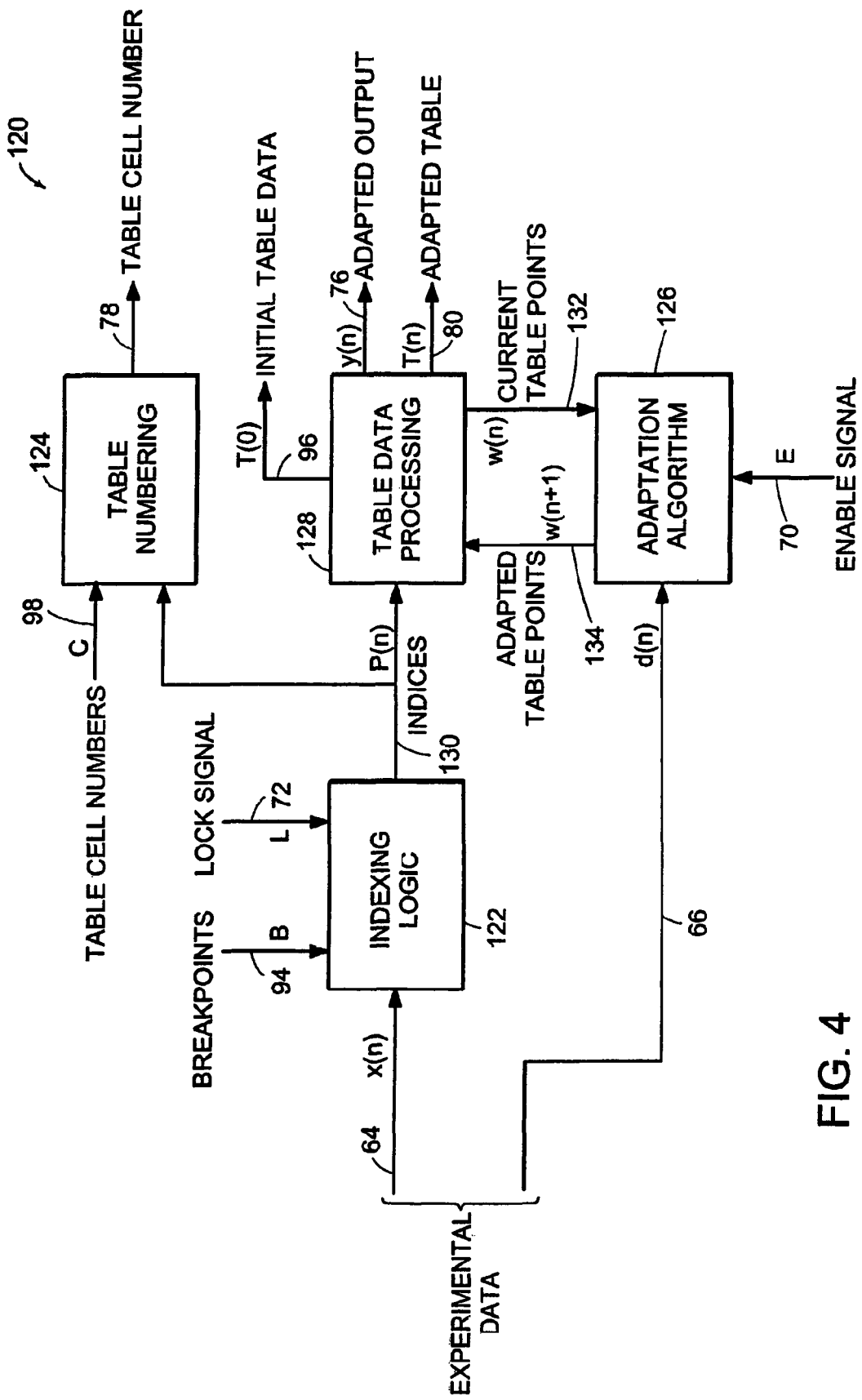
FIG. 4 is a block diagram of an adaptive table lookup corresponding to the adaptive lookup table block shown in FIG. 2.

Referring to FIG. 4, a lookup table generation and adaptation process 120 defined for the graphical block 38 is shown. In the figure, small letters denote numbers (e.g., d(n)), bold small letters denote vectors (e.g., x(n)), capital letters denote sets (e.g., P(n)), and capital bold letters denote multi-dimensional tensors (or arrays) (e.g., T(n)). In the embodiment shown, the process 120 includes four functional components: indexing logic 122, table numbering 124. adaptation algorithm 126 and table data processing 128. The indexing logic 122 receives as inputs the breakpoints 94, the lock signal 72 (optionally) and the input data 64, represented here as an input vector at time n, "x(n)". For a number of plant inputs "l", the input vector is $x(n)=[x_1(n), \ldots, x_l(n)]^T$. For x(n), the corresponding plant output 66 (either measured or simulated, as discussed above), also represented as a vector at time n, is "d(n)". The plant output d(n) 66 is provided to the adaptation algorithm 126.

The indexing logic 122 uses x(n) 64, breakpoints 94 and lock signal 72 (if used) to generate indices P(n) 130. The indices 130 are provided to the table numbering 124 and the table data processing 128. The table numbering 124, which also receives the table cell numbers 98 (from the user block parameter dialog input), uses the cell numbers 98 and the indices 130 to select from the cell numbers 98 the cell number corresponding to the indices 130. The table data processing 128 receives the initial table data 96 (from the user block parameter dialog input), and uses the indices 130 to determine an element or elements at the corresponding table cell location. That element is the element to be updated to take into account the new data, that is, d(n). Thus, the table processing 128 provides the currently stored element or elements 132 to the adaptation algorithm 126, which adapts each element value according to a particular algorithm, as will be described below, and returns the adapted value of that element or elements to the table data processing 128. The table data processing 128 stores the adapted value. The table data processing 128 provides an adapted plant output value as the table output 76, represented as output y(n) at time n. In the cell-based embodiment, y(n) is the same as the stored adapted value, that is, the adapted cell value. In the point-based embodiment, once the element (grid point) values are adapted, an interpolation is performed using the adapted points to determine the adapted output value y(n). If the table data output 80 is configured by the user, then the table data processing 128 also provides as an output the table data 80, or T(n), which incorporates the results of the current adaptation iteration.

For each plant input, $x_i$, there is a corresponding vector of breakpoints $b_i$ with $k_i$ elements, which grids the input space in the $i^{th}$ dimension. The set of all breakpoints which grid the l-dimensional input space is given by $$B=\{b_i \epsilon R^{ki}|k_i \epsilon N, i=1,\ldots,\},\qquad(1)$$

where each $b_i=[b_i(1),\ldots,b_i(k_i)]^T$.

Given the input vector x(n), the set of indices, P(n), is determined so that each index within the set locates the input value $x_i(n)$ within the corresponding vector of breakpoints, $b_i$. That is, $$P(n)=\{p_i(n) \epsilon N|b_i(p_i) \leq x_i(n) \leq b_i(p_i+1), i=1,\ldots,l\}.\qquad(2)$$

The vector of indices p(n) is obtained by ordering the set P(n):

$$p(n)=[p_1(n),\ldots,p_l(n)]^T.\qquad(3)$$

The corresponding set of fractions and the vector of fractions are given by $$F(n)=\{f_i(n) \epsilon R|x_i(n)=(1-f_i(n))b_i(p_i)+f_i(n)b_i(p_i+1), i=1,\ldots,l\}.\qquad(4)$$

and $$f(n)=[f_1(n),\ldots,f_l(n)]^T.\qquad(5)$$

The set of indices P(n) corresponding to an input x(n) at time n is used to select m elements of the current table data T(n):

$$W(n)=\{w_j(n) \epsilon R|w_j(n)=w_j(n;P(n)), j=1,\ldots,m\},\qquad(6)$$

where the number m depends on the type of adaptation scheme that is used. The set W(n) contains those elements of the table T(n) that will be adapted in the current iteration. The ordered set of elements of W(n) is represented by the vector w(n):

$$w(n)=[w_1(n),\ldots,w_n(n)]^T.\qquad(7)$$

The adaptation scheme uses the vector w(n) and the plant output d(n) to generate the table output, y(n), an estimation error e(n) and the new table element values w(n+1):

$$y(n)=w^H(n)u(n)\qquad(8)$$

$$e(n)=d(n)-y(n)\qquad(9)$$

$$w(n+1)=w(n)+h(w(n),e(n),u(n)),\qquad(10)$$

where the form of the vector u(n), and the vector function h(·) depend on the adaptation method used.

Figure 5:
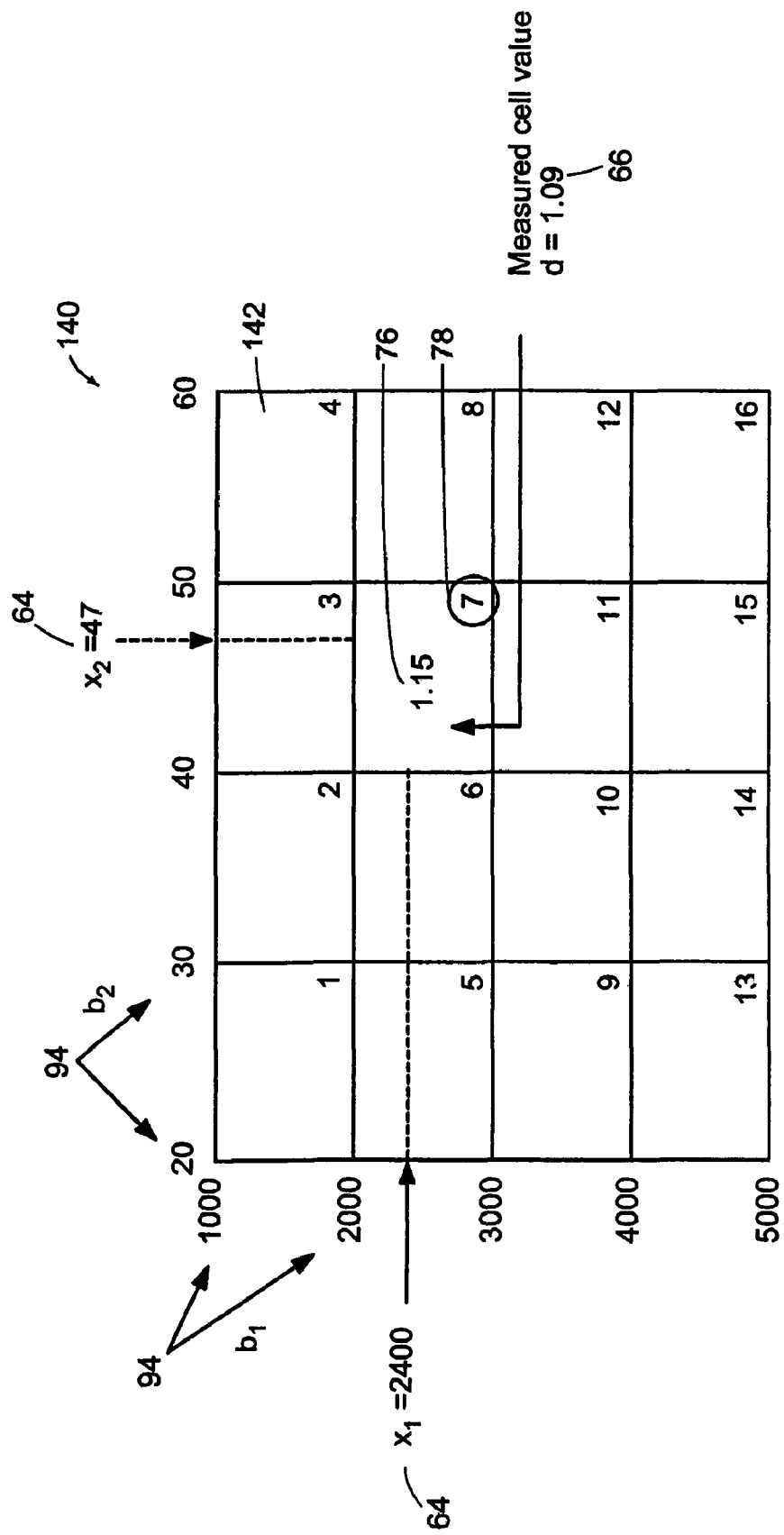
FIG. 5 is a depiction of an exemplary, two-dimensional cell-based ($0^{th}$ order) adaptive table lookup.

In the cell-based embodiment, each element of the lookup table T(n) stores a numeric value corresponding to a particular cell. FIG. 5 shows an example of a two-dimensional table 140 of cells 142 (as defined by the breakpoints 94). In the cell-based adaptation scheme, each cell 142 has an adaptation weight, which depends on the specific adaptation algorithm used. If the current operating point $(x_1, x_2)$ lies within a cell, that cell is adapted using the corresponding plant output data "d" 66. The particular cell is located by comparing the input data with the breakpoints 94 of the corresponding indexing variables. In the example shown, a pair of input data $(x_1=2400, x_2=47)$ is used to locate the corresponding cell to be updated. The adapted cell value "y" 76 and the cell number 78, that is, the values of 1.15 and 7, respectively, are the outputs of the lookup table. The cell value can be used for control, whereas the cell number can be used as an indicator of the current operating point for the user or other logic. Various adaptation algorithms used to update the cell value are discussed below.

One type of adaptation algorithm that can be employed in a cell-based embodiment is Recursive Sample Mean (RSM). For the cell-based embodiment, the sample mean is defined as $$y(n) = 1/n \sum_{i=1}^{n} d(i),\qquad(11)$$

and provides the average value of n output data samples, where each d(i) is the $i^{th}$ measurement collected within a particular cell. For each input data pair $(x_1, x_2)$, the sample mean at the corresponding operating point (cell) is updated using the output data measurement, d.

In practice, instead of accumulating n samples of data for each cell, a recursive relation is used to calculate the sample mean. A recursive expression can be obtained from the definition (11) as follows:

$$y(n) = 1 \bigg/ n \left[\sum_{i=1}^{n-1} d(i) + d(n)\right]\qquad(12)$$
$$= (n-1)n\left[1/n-1 \sum_{i=1}^{n-1} d(i)\right] + (1/n)*d(n)$$
$$= (n-1)/n[y(n-1)] + (1/n)*d(n)$$

where d(n) is the $n^{th}$ data sample.

Using an estimation error defined as e(n)=d(n)−y(n−1), the recursive relation (12) can be written as $$y(n)=y(n-1)+(1/n)*e(n),\qquad(13)$$

where $n \geq 1$ and the initial estimate y(0) is arbitrary. In this expression, only the number of samples, n, for each cell has to be stored in memory, instead of storing n data samples required in Equation (11). A further simplification is possible by reformulating the recursion (13) as $$w(n)=w(n-1)+1,$$

$$y(n)=y(n-1)+e(n)/w(n), \quad (14)$$

where w(n) is the recursive adaptation weight with initial value w(0)=0.

The recursive mean algorithm defined in Equation (13) has an infinite memory so that the past data samples have the same weight as the final sample in the calculation of the sample mean. In contrast, an RSM algorithm with a forgetting factor puts more weight on the more recent samples and has robustness against initial response transients of the plant behavior. In addition, the forgetting factor provides an adjustable speed of adaptation. The recursive sample mean with forgetting factor is defined as $$y(n) = 1 \Big/ \left[\sum_{i=1}^{n} \lambda^{n-i}\right]\left[\sum_{i=1}^{n} \lambda^{n-i} d(i)\right] \quad (15)$$

$$= 1 \Big/ \left[\sum_{i=1}^{n} \lambda^{n-i}\right]\left[\sum_{i=1}^{n-1} \lambda^{n-i} d(i) + d(n)\right]$$

$$= [s(n-1)/s(n)] * y(n-1) + 1/s(n) * d(n)$$

where $\lambda \in [0,1]$ is the forgetting factor and $$s(k) = \sum_{i=1}^{k} \lambda^{n-i}.$$

Using the estimation error defined as e(n)=d(n)−y(n−1), the recursive relation (15) can be written as $$y(n) = y(n-1) + [1/s(n)] * e(n) \quad (16)$$

$$= y(n-1) + [(1-\lambda)/(1-\lambda^n)] * e(n),$$

where n≧1 and the initial estimate y(0) is arbitrary. It should be noted that a small value for λ results in faster adaptation. A further simplification is possible by reformulating the recursion (16) as $$w(n)=\lambda w(n-1)+1,$$

$$y(n)=y(n-1)+e(n)/w(n) \quad (17)$$

where w(n) is the recursive adaptation weight with initial value w(0)=0.

The Recursive Sample Mean and the Recursive Sample Mean with Forgetting Factor adaptation techniques discussed above are equivalent to the well-known Recursive Least Squares (RLS) algorithm in one dimension, where the variable k(n)=1/w(n) is the gain vector.

Figure 6:
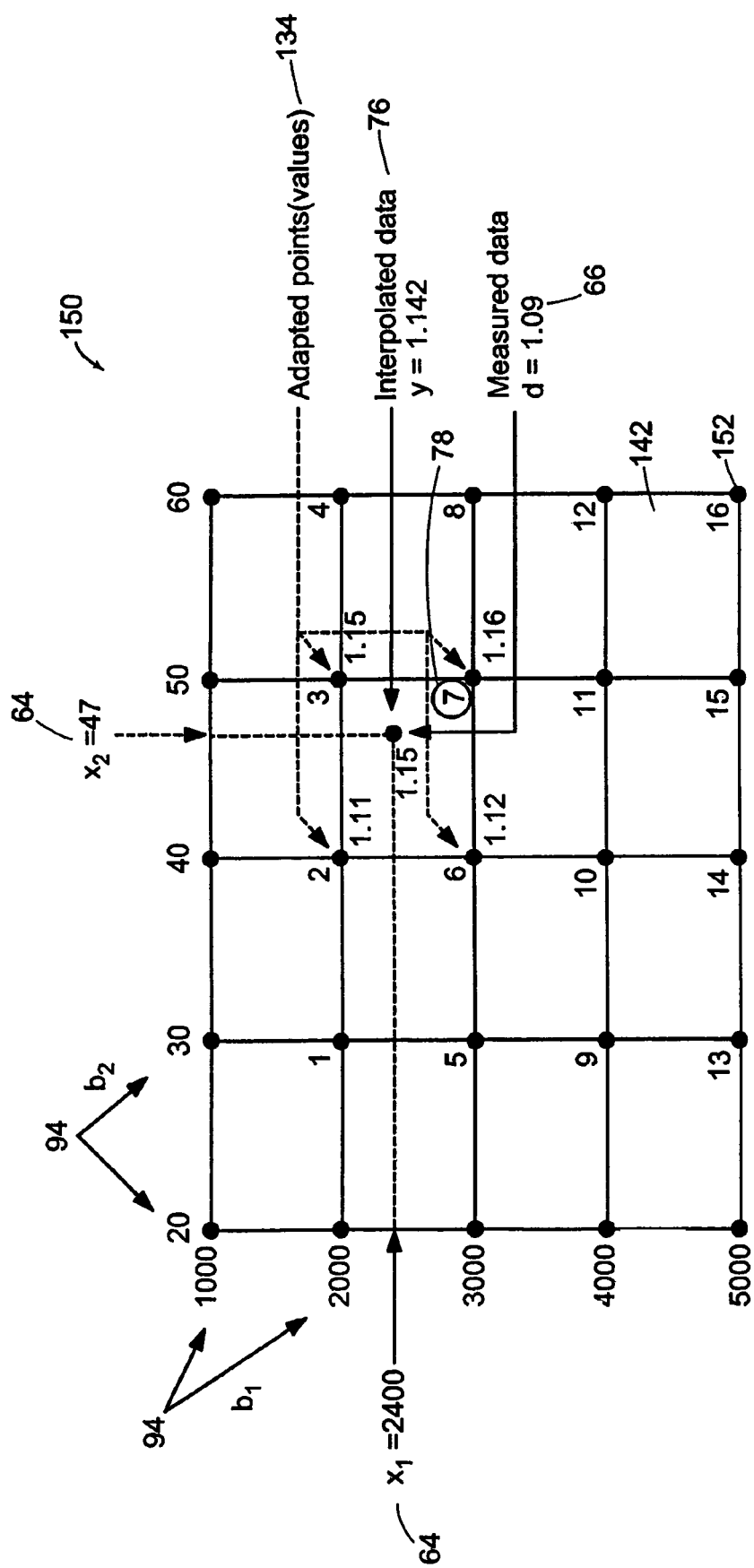
FIG. 6 is a depiction of an exemplary, two-dimensional point-based ($1^{st}$ order) adaptive table lookup.

In a point-based embodiment, each element of the lookup table stores a numeric value corresponding to a particular point which is a location in the multi-dimensional space defined by the breakpoints of the indexing variables. FIG. 6 shows an example of a two-dimensional point-based lookup 150, where each dot represents a point 152. In the point-based embodiment, each point has an adaptation weight, which depends on the specific adaptation algorithm used. If the current operating point ($x_1$, $x_2$) lies within a cell, the points that define the boundaries of that cell are adapted (adapted point values 134) according to where the operating point is located relative to the measured data, shown in the example as d=1.09. The particular cell is located by comparing the input data 64 with the breakpoints 94 of the corresponding indexing variables. In the example shown, a pair of input data ($x_1$=2400, $x_2$=47) 64 and the adapted points around this operating point 134 are shown in the figure. The value of the "adapted" operating point 76 (y=1.142), which is found by interpolation of the adapted (neighboring) table points, and the cell number 78 are the outputs. The interpolated point table output value 76 is used for control, whereas the cell number 78 is used as an indicator of the current operating point for the user or other logic.

The adaptation algorithms used to update the point-based lookup table values include, but are not limited to, the well-known Least-Mean Squares (LMS) or Recursive Least Squares (RLS) techniques. The LMS technique uses the adaptation equations (8, 9, 10) with $$u(n) = u_m(n), m = 2, \text{ where} \quad (18)$$

$$u_i(n) = u_{i-1}(n) \otimes \begin{bmatrix} 1 - f_i(n) \\ f_i(n) \end{bmatrix}. \quad (19)$$

In equation (19), the symbol ⊗ denotes the Kronecker product with i≧1 and $u_0(n)$=1.

The granularity of the breakpoints sets can be used to control the precision of the output y(n). Greater spacing between breakpoints results in a higher degree of datapoint compression, that is, in fewer cells. A reduced spacing between the breakpoints means more cells for a finer (more precise) representation of the plant output (surface).

It is also possible to incorporate into the block functionality logic that samples the plant output data values as they are made available for use by the adaptive lookup block 38, thus selecting which of the values are used (or are not used) in the adaptation.

Figure 7A:
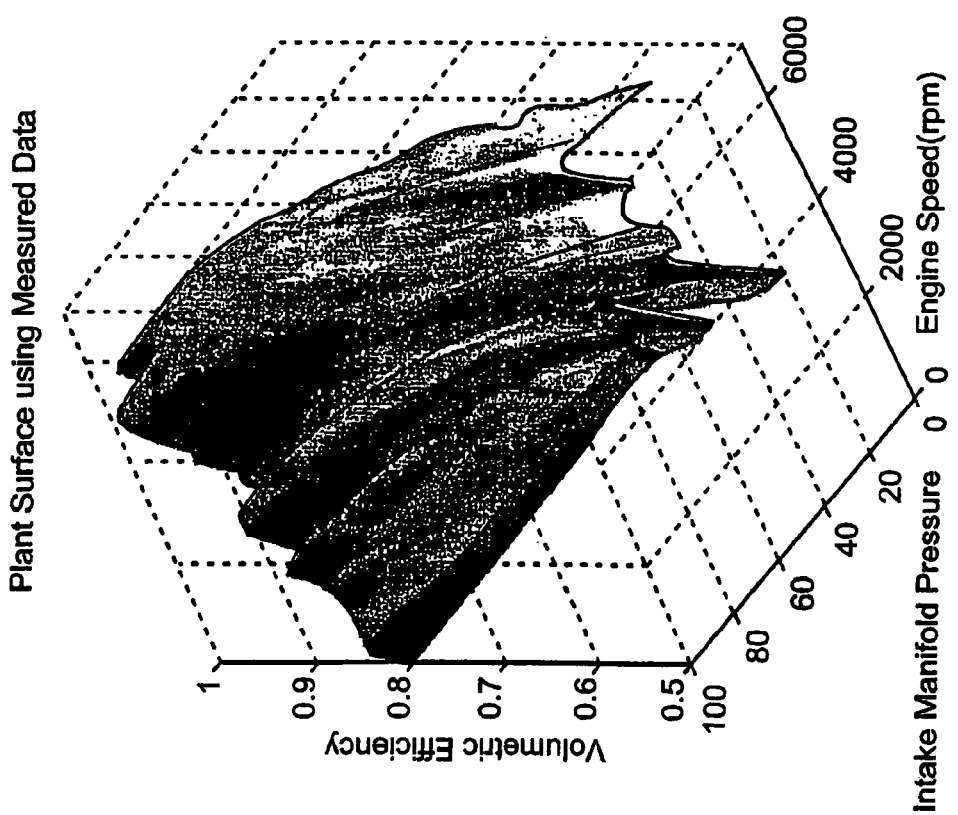

FIGS. 7A and 7B are plant surface plots of volumetric efficiency as a function of intake manifold pressure and engine speed. The plot shown in FIG. 7A was generated directly from measured values of volumetric efficiency, whereas the plot of FIG. 7B was generated from the output of the block 38 in a cell-based embodiment, that is, using adapted values of volumetric efficiency to provide a close approximation of the plant surface, as seen in the figures.

The lookup table generation and adaptation block is useful in a number of different types of applications. As already described above and depicted in FIG. 1, the block can be used to model the steady-state behavior of an unknown system (plant) by measuring outputs from sensors on the plant and capturing the data into the adaptive table. This behavior information can then be used to construct a time-varying plant model that will later be used during control design. The adaptive lookup table can also be used in a real-time environment, where some time-varying properties of a system need to be captured. For such an application, the model 62 can be created and initialized using the block dialog 90, as discussed above. Instead of executing the model during a simulation run, using measured or simulated plant data, however, the module 24 generates executable C code from the method(s) and block parameter values defined for the block 38 using the code generator 48, e.g., Real-Time Workshop® available from The Mathworks, Inc. The code could then be loaded into the microcomputer or controller of the target application. Applications that could use the generated adaptive lookup table program include: real-time adaptation and control applications, e.g., of hydraulic servo or proportional valves in the presence of valve wear and pressure/flow variations, as well as control applications which use real-time (or off-line) generation of tables, e.g., in the automotive context, generation of fuel tables to comply with emission standards and ensure that a stoichiometric Air-to-Fuel Ratio is held in the presence of engine changes due to aging and environmental conditions, or. in the Aerospace context, generation and adaptation of flight-tables in airplane control applications.

In some real-time adaptation and control environments in which output data is collected via sensors, the output data signals may be particularly noisy. In a noisy environment, the table can be operated in adaptation mode to smooth the values in the table. That is, although real output data measurements are available, it may desirable to use the processed lookup table values in place of those measurements. Moreover, system reliability may be enhanced through the inclusion of the lookup table in an environment in which sensor data is normally used. For example, if a sensor fails, the table lookup adaptation can be disabled and the content of the table can be made available in a static table lookup mode. Consequently, output data values are always available.

For a control application in which sensor data is not collected in real-time, lookup table content can be captured in a laboratory first and then loaded into a table for use in a static table lookup mode. At some later point in time, after the table has been operating as a static lookup table, because system conditions may have changed over time, it may be desirable to calibrate the table contents. Thus, the table can be connected to sensors and switched to adaptation mode for some period of time to calibrate the contents. Once the content has been calibrated, the table adaptation is again disabled and the table operates in static table lookup mode with the new values generated during the calibration/adaptation process.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method, comprising:
   interacting with an executable dynamic lookup table block, the dynamic lookup table block in an executable graphical diagram, where the dynamic lookup table block includes:
   a dynamic lookup table, the dynamic lookup table including: an adaptation algorithm for adapting values in the dynamic lookup table according to an adaptation scheme when the dynamic lookup table block is executing in the executable graphical diagram;
   modifying a behavior of the adaptation scheme in response to a control signal;
   displaying a surface representing values related to a plurality of elements in the dynamic lookup table;
   accessing updated values related to one or more of the plurality of elements;
   updating the surface to produce an updated surface, the updated surface representing one or more of the updated values for the plurality of elements in the dynamic lookup table; and
   displaying the updated surface representing the one or more of the updated values to provide a user or a device with information about the one or more of the updated values of the dynamic lookup table.

2. The method of claim 1, wherein the plurality of elements represent a plurality of cells and the updated surface comprises one or more updated values for one or more of the plurality of cells.

3. The method of claim 1, wherein the displaying a surface or the displaying an updated surface further comprises:
   identifying one of the plurality of elements; and
   indicating an updated value for the identified one of the plurality of elements.

4. The method of claim 1, further comprising:
   identifying an operating point on the surface or the updated surface, the operating point representing a value on the surface or the updated surface.

5. The method of claim 4, further comprising:
   displaying the operating point in relation to the surface or the updated surface for a user.

6. The method of claim 1, further comprising:
   accessing a plurality of updated values at a plurality of intervals; and
   displaying the plurality of updated values via a plurality of updated surfaces to provide a changing surface to a user.

7. The method of claim 1, further comprising:
   adapting the dynamic lookup table according to determined parameters, the determined parameters specified by a user or by the dynamic lookup table.

8. The method of claim 7, further comprising:
   modifying the values or the updated values based on the adapting.

9. A method, comprising:
   generating an identifier for a dynamic lookup table containing one or more values, the dynamic lookup table associated with an executable graphical block used in an executable graphical block diagram model, the dynamic lookup table including an adaptation algorithm for adapting values in the dynamic lookup table according to an adaptation scheme when the executable graphical block executes during simulation of the graphical block diagram model, the identifier generated based on a user input or a device generated input;
   modifying a behavior of the adaptation scheme in response to a control signal; and
   displaying the identifier in association with the one or more values in the dynamic lookup table to provide a user with information related to the dynamic lookup table.

10. The method of claim 9, further comprising:
    adapting the dynamic lookup table according to determined parameters related to a graphical simulation; and
    displaying the identifier in association with the one or more values or with one or more adapted values, the adapted values based on the adapting.

11. The method of claim 9, further comprising:
    generating a surface using the one or more values specified by the user or the device.

12. The method of claim 11, further comprising:
    identifying an operating point on the surface.

13. The method of claim 11, further comprising:
    associating the one or more values with one or more elements in the dynamic lookup table.

14. The method of claim 13, where the displayed identifier identifies one of the one or more values in the dynamic lookup table.

15. A method, comprising:
    identifying one of a plurality of values or one of a plurality of elements in a dynamic lookup table, the dynamic lookup table including an adaptation algorithm for adapting the plurality of values in the dynamic lookup table according to an adaptation scheme, the dynamic lookup table in an executable dynamic lookup table block of a graphical model, the executable dynamic lookup table block executing when the graphical model simulates;

modifying a behavior of the adaptation scheme in response to a control signal;

indicating the identified one of the plurality of values or the identified one of the plurality of elements to indicate the identified one of the plurality of values or the identified one of the plurality of elements in the dynamic lookup table; and displaying the indicated one of the plurality of values or the plurality of elements of the dynamic lookup table with at least a subset of the plurality of values.

16. The method of claim 15, further comprising:
adapting one or more of the plurality of values according to determined parameters, the adapting performed using the adaptation algorithm; and associating the indicated one of the plurality of values or the plurality of elements of the dynamic lookup table with an identified one of the adapted one or more of the plurality of values.

17. A method, comprising:
identifying one or more table values in a dynamic lookup table, the dynamic lookup table including an adaptation algorithm for adapting values in the dynamic lookup table according to an adaptation scheme, the dynamic lookup table in an executable graphical block, the executable graphical block in a graphical model, the executable graphical block executing when the graphical model is simulated;

modifying a behavior of the adaptation scheme in response to a control signal;

updating cell values in the one or more identified table values with one or more updated input values; and accessing one of the updated cell values to provide an output value to a destination, the output value related to the accessed cell value.

18. The method of claim 17, further comprising:
adapting the dynamic lookup table to produce adapted cell values, the adapted cell values comprising adapted input values; and accessing the adapted cell values to provide one or more adapted output values to the destination, the one or more adapted output values related to one or more adapted cell values.

19. The method of claim 17, wherein the one or more updated input values are provided to an output associated with a graphical representation.

20. The method of claim 19, wherein the graphical representation is a block in a block diagram model.

21. The method of claim 17, further comprising:
displaying a surface comprising information related to the one or more updated cell values, the displaying to provide a user with information about the dynamic lookup table.

22. A method, comprising:
identifying one or more values associated with intersections of one or more variables in a dynamic lookup table, the dynamic lookup table including an adaptation algorithm for adapting values in the dynamic lookup table according to an adaptation scheme, the dynamic lookup table associated with a graphical block in an executable graphical model, the graphical block executing when the graphical model is simulated;

updating the dynamic lookup table with one or more input values, the updating related to the intersections;

modifying a behavior of the adaptation scheme in response to a control signal;

interpolating to certain of the one or more input values to produce interpolated input values when the certain of the one or more input values do not correspond with one or more of the intersections; and storing the interpolated input values in a storage device.

23. The method of claim 22, further comprising:
performing an adaptation operation on the dynamic lookup table to produce one or more adapted input values, the adaptation operation performed using the adaptation algorithm; and sending one or more adapted output values to the destination, the adapted output values related to the adapted input values.

24. The method of claim 23, further comprising:
displaying a surface comprising information related to the one or more input values, the one or more interpolated input values or the one or more adapted output values.

25. A method for adapting a dynamic lookup table, the method comprising:
applying a control signal to a dynamic lookup table comprising a plurality of elements having values associated therewith, the dynamic lookup table in a graphical block of an executable graphical model, the dynamic lookup table further including an adaptation algorithm configured to adapt values in the dynamic lookup table according to an adaptation scheme when the graphical block is executing, the control signal modifying a behavior of the adaptation scheme;

adapting at least a subset of the values according to determined parameters based on the control signal to produce adapted values compatible with a destination; and storing at least one adapted value in a storage device, the stored at least one adapted value accessible to a device that includes the dynamic lookup table or to the destination.

26. The method of claim 25, wherein the destination is a graphical representation in a model, a target device, or a code generator.

27. The method of claim 25, further comprising:
varying the adapting by varying the control signal.

28. The method of claim 27, wherein the control signal enables or disables the adapting.

29. The method of claim 25, wherein the control signal controls the updating of the values.

30. A method, comprising:
identifying a plurality of values associated with an adaptive lookup table used in a graphical simulation environment, the adaptive lookup table associated with a graphical representation displayed in the graphical simulation environment, the adaptive lookup table including an adaptation algorithm for adapting values in the adaptive lookup table according to an adaptation scheme when the graphical simulation environment is simulating;

modifying a behavior of the adaptation scheme in response to a control signal;

generating code for a device using the identified plurality of values, the generated code allowing the device to perform an operation; and storing the generated code in memory.

31. The method of claim 30, further comprising:
identifying a second plurality of values in a second adaptive lookup table and using the second plurality of values in the generating.

32. The method of claim 31, wherein the generating comprises generating first code for the device;
and wherein the method further comprises:
adapting the plurality of values based on one or more input values to produce updated values; and
generating second code for the device using the updated values.

33. A method, comprising:
identifying an environmental characteristic;
accessing a first adaptive lookup table retrieved from memory, the first adaptive lookup table including an adaptation algorithm for adapting values in the first adaptive lookup table according to an adaptation scheme, the adaptation algorithm interacting with the environmental characteristics;
modifying a behavior of the adaptation scheme in response to a control signal;
adapting operation of a device based on one or more values from the first adaptive lookup table, the one or more values related to the environmental characteristic; and
performing an operation with the device, the operation based on the one or more values in the first adaptive lookup table.

34. The method of claim 33, further comprising:
interacting with a second adaptive lookup table based on a change in the environmental characteristic; and
adapting operation of the device based on the change using one or more values from a second adaptive lookup table.

35. The method of claim 34, wherein the first adaptive lookup table or the second adaptive lookup table are on the device.

36. The method of claim 33, wherein the one or more values are obtained from a graphical simulation environment.

37. A method, comprising:
receiving an output signal from a device;
processing the output signal using an adaptive lookup table that includes an adaptation algorithm for adapting values in the adaptive lookup table according to an adaptation scheme, the adaptive lookup table interacting with a graphical simulation component, the graphical simulation component in an executable graphical model, the graphical simulation component executing when the graphical model executes;
modifying a behavior of the adaptation scheme in response to a control signal; and
producing a result based on the processing, wherein the result is used to characterize the device.

38. The method of claim, 37 wherein the processing further comprises:
processing the output signal at a first time interval using a first value in the adaptive lookup table; and
processing the output signal at a second time interval using a second value in the adaptive lookup table, the second value updated with respect to the first value.

39. A method, comprising:
receiving output data from a system via an adaptive lookup table that interacts with a graphical simulation environment, the adaptive lookup table including an adaptation algorithm for adapting values in the adaptive lookup table according to an adaptation scheme when the graphical simulation environment is simulating, the adaptive lookup table associated with a graphical representation in the graphical simulation environment;
reducing noise associated with the output data by applying the adaptation algorithm to the output data to produce processed output data;
modifying a behavior of the adaptation scheme in response to a control signal; and
updating a value in the adaptive lookup table using the processed output data, the updating associated with adapting the adaptive lookup table based on the output data, the adapting performed using the adaptation algorithm in the adaptive lookup table.

40. The method of claim 39, wherein the applying the adaptation algorithm allows the adaptive lookup table to operate as a noise tolerant adaptive lookup table.

41. The method of claim 39, further comprising:
selecting the adaptation algorithm from a plurality of adaptation algorithms.

42. A method, comprising:
receiving environmental values from a sensor via an adaptive lookup table associated with a graphical block used in a graphical simulation environment, the adaptive lookup table further comprising an adaptation algorithm for adapting values in the adaptive lookup table according to an adaptation scheme when the graphical block executes in the graphical simulation environment;
modifying a behavior of the adaptation scheme in response to a control signal; and
updating table values in the adaptive lookup table based on the environmental values.

43. The method of claim 42, wherein the updating adapts the adaptive lookup table to an environment associated with the environmental values.

44. The method of claim 42, wherein the adaptive lookup table operates in a device, and the method further comprises:
adapting operation of the device based on the environmental values.

45. A portable device, comprising:
an interface to receive input values; and
a dynamic lookup table comprising:
table values that are updated based on the input values, the dynamic lookup table configured based on:
a simulation result produced using a dynamic lookup table block that executes in a graphical model, the dynamic lookup table block including an adaptation algorithm for adapting values, according to an adaptation scheme, in one or more dynamic lookup tables associated with the dynamic lookup table block, the adapting performed when the graphical model executes; and
a control signal that modifies a behavior of the adaptation scheme.

46. The device of claim 45, wherein the device adapts when the dynamic lookup table is updated.

47. The device of claim 45, wherein the device further comprises:
a plurality of adaptation algorithms that operate with the dynamic lookup table when the dynamic lookup table is updated.

* * * * *

UNITED STATES PATENT AND TRADEMARK OFFICE
CERTIFICATE OF CORRECTION

PATENT NO.         : 7,930,153 B2
APPLICATION NO.    : 11/583416
DATED              : April 19, 2011
INVENTOR(S)        : Bora Eryilmaz et al.

It is certified that error appears in the above-identified patent and that said Letters Patent is hereby corrected as shown below:

On the front page of the letters patent, under Assignee, please delete "The Math Works, Inc." and replace with, --The MathWorks, Inc.--.

At column 1, line 6 (Specification), of the printed patent, please delete "Ser. No. 11/583,416, now" after of.

At column 1, line 8 (Specification), of the printed patent, please delete "Ser. No. 10/36,675, now" after of.

Signed and Sealed this
Twenty-fifth Day of September, 2012

David J. Kappos
*Director of the United States Patent and Trademark Office*